(12) United States Patent
Mori et al.

(10) Patent No.: US 9,169,879 B2
(45) Date of Patent: Oct. 27, 2015

(54) DOG CLUTCH CONTROL APPARATUS FOR AUTOMATED TRANSMISSION

(71) Applicant: Aisin Seiki Kabushiki Kaisha, Kariya-shi (JP)

(72) Inventors: Kyosuke Mori, Kariya (JP); Yasuhisa Iwasaki, Ichinomiya (JP); Keisuke Mishima, Takahama (JP); Yusuke Yoshida, Kitanagoya (JP); Masahiko Komura, Ichinomiya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 78 days.

(21) Appl. No.: 14/168,127

(22) Filed: Jan. 30, 2014

(65) Prior Publication Data
US 2014/0209426 A1    Jul. 31, 2014

(30) Foreign Application Priority Data

Jan. 31, 2013  (JP) ................................. 2013-017265

(51) Int. Cl.
| | | |
|---|---|---|
| *F16D 11/00* | (2006.01) | |
| *F16D 11/10* | (2006.01) | |
| *F16D 21/04* | (2006.01) | |
| *F16H 63/30* | (2006.01) | |

(52) U.S. Cl.
CPC ............... *F16D 11/10* (2013.01); *F16D 21/04* (2013.01); *F16D 2011/002* (2013.01); *F16D 2011/008* (2013.01); *F16D 2500/10462* (2013.01); *F16H 2063/3093* (2013.01)

(58) Field of Classification Search
CPC ................ F16D 2500/10462; F16D 2011/008; F16H 2063/3093
USPC .......................................................... 192/52.2
See application file for complete search history.

(56) References Cited

U.S. PATENT DOCUMENTS

| | | | | |
|---|---|---|---|---|
| 2,291,851 | A * | 8/1942 | Wahlberg et al. ............. | 192/69.9 |
| 2004/0104092 | A1 * | 6/2004 | Nakai .......................... | 192/69.9 |
| 2006/0027434 | A1 * | 2/2006 | Capito ........................ | 192/69.83 |
| 2010/0276245 | A1 * | 11/2010 | Umeno et al. .............. | 192/69.81 |
| 2013/0240317 | A1 | 9/2013 | Mori et al. | |
| 2013/0240318 | A1 | 9/2013 | Mori et al. | |
| 2014/0283637 | A1 * | 9/2014 | Iwasaki et al. .................. | 74/335 |
| 2014/0291102 | A1 * | 10/2014 | Iwasaki et al. ............... | 192/69.8 |

FOREIGN PATENT DOCUMENTS

JP        11-82710        3/1999

* cited by examiner

*Primary Examiner* — Robert Hodge
*Assistant Examiner* — Ryan Dodd
(74) *Attorney, Agent, or Firm* — Oblon, McClelland, Maier & Neustadt, L.L.P.

(57) ABSTRACT

A dog clutch control apparatus for an automated transmission includes a dog clutch transmission mechanism including a clutch ring, a clutch hub, a sleeve, an axial driving device, a dog clutch portion, a stroke position sensor, and a spline of the sleeve including high teeth and a low tooth, the dog clutch portion including clutch front teeth and clutch rear teeth, wherein in a rotation adjustment range, a control apparatus controls a thrust load of the axial driving device so that a first thrust load is applied to the sleeve, and the first thrust load generates a relative rotation between the sleeve and the dog clutch portion against a frictional force generated by contact between an end surface of each of the high teeth and a front end surface of each of the clutch rear teeth.

8 Claims, 9 Drawing Sheets

DOG CLUTCH CONTROL APPARATUS FOR AUTOMATED TRANSMISSION

CROSS REFERENCE TO RELATED APPLICATIONS

This application is based on and claims priority under 35 U.S.C. §119 to Japanese Patent Application 2013-017265, filed on Jan. 31, 2013, the entire content of which is incorporated herein by reference.

TECHNICAL FIELD

This disclosure generally relates to a dog clutch control apparatus for an automated transmission.

BACKGROUND DISCUSSION

Conventionally, a powertrain of a vehicle includes a transmission which changes torque and/or the number of rotations of a driving apparatus including, for example, an engine and/or an electric motor, which is used for driving a driving wheel, so that the torque and/or rotations are transmitted to the driving wheel according to running conditions of the vehicle. There are some types of transmissions including, for example, a normally-meshed type transmission. For example, a known normally-meshed type transmission includes plural idler gears, each of which is fitted to, that is, provided at a rotary shaft connected to the driving wheel to be rotatable relative to the rotary shaft and not to be movable in a direction of a rotational axis, and plural gears, which are provided around a periphery of a counter shaft arranged to be parallel to the rotary shaft. The idler gears and the gears normally mesh with each other. According to the known normally-engaged type transmission, a sleeve is spline-fitted to the rotary shaft to be movable in the direction of the rotational axis, and the sleeve is arranged side by side with the idler gear. Engaging teeth (spline), which are provided at a joining surface of the sleeve which is joined to the idler gear, are brought to be engaged with engaged teeth (dog clutch teeth), which are provided at a joined surface of the idler gear. Thus, the idler gear engaged with the sleeve and the rotary shaft rotate integrally with each other. As the idler gear which rotates integrally with the rotary shaft and the gear of the counter shaft which meshes with the idler gear rotate in association with each other, torque and/or the number of rotations of the rotary shaft is transmitted to the counter shaft. A shifting operation is performed by selecting, from among the plural idler gears which include different numbers of teeth to each other, the idler gear that is to be rotated integrally with the rotary shaft and by bringing the sleeve into engagement with the selected idler gear. Depending on a timing at which the sleeve is pressed against the idler gear, there may be a case where the sleeve and the idler gear fail to engage with each other properly.

In such an instance where the sleeve is not properly engaged with the idler gear, according to JPH11-82710A (hereinafter referred to as Patent reference 1), torque with which the sleeve is pushed against the idler gear-side is once reduced, and after this, the sleeve is pushed against the idler-gear side again with a large torque in order to engage the sleeve and the idler gear with each other properly.

According to Patent reference 1, in a case where the sleeve is not brought into engagement with the idler gear, only an engagement operation is performed again. Therefore, without starting a shifting operation from the beginning, the sleeve and the idler gear are brought into engagement with each other.

According to the known shift control method described in Patent reference 1, however, a timer is used to determine that the sleeve is unable to be brought into engagement with a dog clutch of the idler gear. In a case where the sleeve does not reach a predetermined engagement position even though a predetermined time has passed, a reentry control, under which the sleeve is brought into engagement with the idler gear again, is executed. Thus, an entry control end time before the reentry, which is set by the timer, needs to be set at a value that is equal to or longer than a period of time for the sleeve to move to the predetermined position properly (that is, the period of time for the sleeve to engage with the dog clutch without being bounced back by the dog clutch). Accordingly, at a time point at which it is determined that the sleeve is unable to be brought into engagement with the dog clutch of the idler gear, the dog clutch is already pushed against the sleeve, and thus a difference in the number of rotations between the sleeve and the idler gear is already reduced to be minute or slight. Therefore, it takes time until the sleeve and the idler gear come to the next position at which the sleeve and the idler gear are engaged with each other. Alternatively, it takes longer time until the sleeve and the idler gear engage with each other next because the sleeve and the idler gear co-rotate with each other. As a result, a time for the shifting operation may be long.

A need thus exists for a dog clutch control apparatus for an automated transmission, which is not susceptible to the drawback mentioned above.

SUMMARY

According to an aspect of this disclosure, the dog clutch control apparatus for an automated transmission includes a rotary shaft which is rotatably connected to one of an input shaft of an automated transmission and an output shaft of the automated transmission, and is supported to be rotatable about an axis, a dog clutch transmission mechanism including a clutch ring which is rotatably supported at the rotary shaft and is rotatably connected to the other one of the input shaft and the output shaft, the clutch ring including a mating portion protruding towards the sleeve, a clutch hub which is fixed to the rotary shaft and is arranged adjacent to the clutch ring, a sleeve which is provided with a spline and is fitted with the clutch hub by the spline to be movable in a direction of the axis, an axial driving device for moving the sleeve in the direction of the axis, a dog clutch portion which is provided at the mating portion of the clutch ring and selectively meshes with the spline of the sleeve in response to an axial movement of the sleeve, and a stroke position sensor for detecting a moving position of the sleeve in the direction of the axis, the spline including a plurality of high teeth, the rest of the spline corresponding to a low tooth, a tooth depth of each of the high teeth is larger than a tooth depth of the low tooth, the dog clutch portion including the same number of clutch front teeth as the number of the high teeth, an outer diameter of the clutch front teeth is larger than an inner diameter of the high teeth and is smaller than an inner diameter of the low tooth, the clutch front teeth being arranged at positions which correspond to positions of the high teeth, each of the clutch front teeth being formed to be extended from a front end surface of the dog clutch portion to a rear end position of the dog clutch portion, the dog clutch portion including clutch rear teeth configured to mesh with tooth grooves of the spline, each of the clutch rear teeth being formed to be extended from a position which is retracted from the front end surface of the dog clutch portion by a predetermined amount to the rear end position of the dog clutch portion, and a control apparatus for controlling operation of the axial driving device on the basis of the moving position of the sleeve detected by the stroke position sensor, wherein in a rotation adjustment range where each of the high teeth of the spline advances from a front end portion of each of the clutch front teeth to a front end portion of each of the clutch rear teeth, the control apparatus controls a thrust load of the axial driving device so that a first thrust load is applied to the sleeve, and the first thrust load generates a relative rotation between the sleeve and the dog clutch portion with each other against a frictional force which is generated by contact between an end surface of each of the high teeth of the sleeve and a front end surface of each of the clutch rear teeth of the dog clutch portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
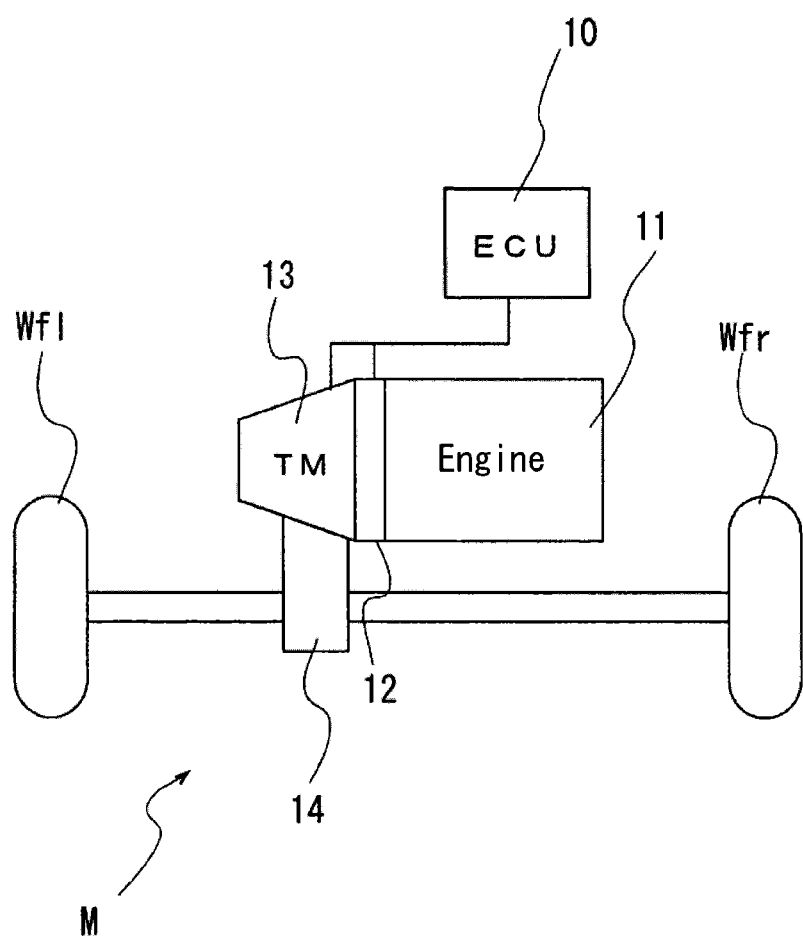
FIG. 1 is a schematic view of a vehicle mounted with an automated transmission including a dog clutch according to an embodiment disclosed here.

An embodiment, in which an automated transmission provided with a dog clutch control apparatus for an automated transmission is applied to a vehicle, will be explained with reference to the drawings. As illustrated in FIG. 1, a vehicle M includes, an engine 11, a clutch 12, an automated transmission 13, a differential apparatus 14 and driving wheels (left and right front wheels) Wfl, Wfr. The engine 11 generates drive power by combusting fuel. It is configured so that the drive power of the engine 11 is transmitted to the driving wheels Wfl, Wfr via the clutch 12, the automated transmission 13 and the differential apparatus 14, that is, the vehicle M is a so-called front wheel drive vehicle.

The clutch 12 is configured to be connected and disconnected automatically according to a command of a control apparatus (ECU) 10. The automated transmission 13 includes therein a dog clutch transmission mechanism, and automatically selects, for example, six forward gears and one backward gear. The differential apparatus 14 includes a final gear and a differential gear, and is formed integrally with the automated transmission 13.

Figure 2:
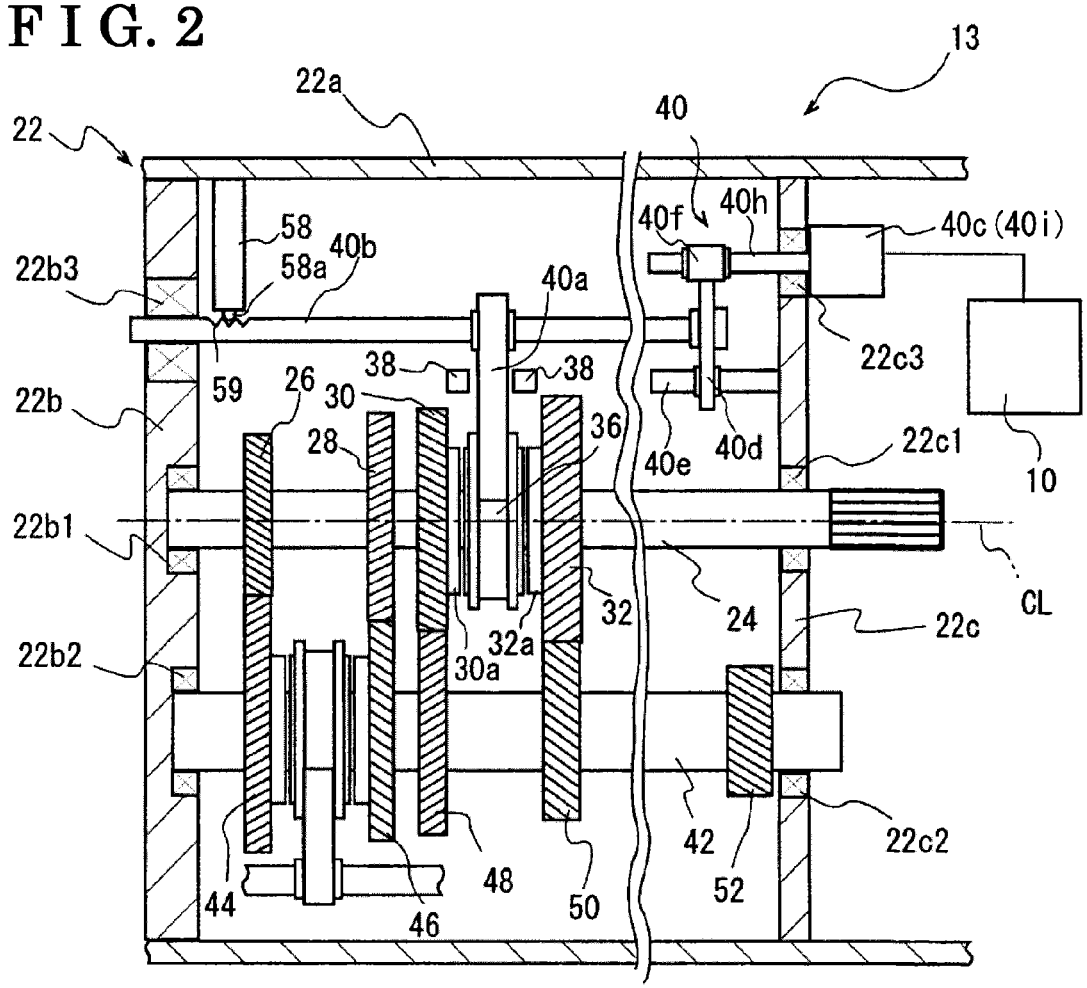
FIG. 2 is a schematic diagram of the automated transmission including the dog clutch according to the embodiment.

As illustrated in FIG. 2, the automated transmission 13 includes a casing 22, an input shaft (i.e., a rotary shaft) 24, a first input gear 26, a second input gear 28, a third clutch ring (a third input gear) 30, a fourth clutch ring (a fourth input gear) 32, a clutch hub (i.e., a hub) 34, a sleeve 36, a stroke position sensor 38, an axial driving device 40, an output shaft 42, a first clutch ring (a first output gear) 44, a second clutch ring (a second output gear) 46, a third output gear 48 and a fourth output gear 50. A first dog clutch transmission mechanism is formed by, for example, the first clutch ring (the first output gear) 44, the second clutch ring (the second output gear) 46, the clutch hub (the hub) 34, the sleeve 36 and an axial driving device. A second dog clutch transmission mechanism is formed by, for example, the third clutch ring (the third input gear) 30, the fourth clutch ring (the fourth input gear) 32, the clutch hub (the hub) 34, the sleeve 36, the stroke position sensor 38 and the axial driving device 40. The dog clutch control apparatus for the automated transmission is formed by, for example, the first and second dog clutch transmission mechanisms and the control apparatus 10.

The casing 22 includes a main body 22a formed in a substantially closed-end cylindrical configuration, a first wall 22b which corresponds to a bottom wall of the main body 22a and a second wall 22c dividing inside of the main body 22a in the right and left direction when viewed in FIG. 2.

The input shaft 24 is rotatably supported at the casing 22. That is, a first end (the left end when viewed in FIG. 2) of the input shaft 24 is supported at the first wall 22b via a bearing 22b1 and a second end side (the right end when viewed in FIG. 2) of the input shaft 24 is supported at the second wall 22c via a bearing 22c1. The second end of the input shaft 24 is rotatably connected to an output shaft of the engine 11 via the clutch 12. Thus, output of the engine 11 is inputted to the input shaft 24 in a case where the clutch 12 is connected. The input shaft 24 serves as the rotary shaft of this disclosure. The input shaft (the rotary shaft) 24 of this disclosure is rotatably connected directly to the input shaft of the automated transmission 13 and is supported to be rotatable about a rotational axis (i.e., an axis) CL.

At the input shaft 24, the first input gear 26, the second input gear 28, the third clutch ring (the third input gear) 30 and the fourth clutch ring (the fourth input gear) 32 are provided. The first and second input gears 26 and 28 are fixed to the input shaft 24 by, for example, spline-fitting, so as not to be rotatable relative to the input shaft 24. The third input gear is formed at an outer periphery of the third clutch ring 30 which is supported at the input shaft 24 to be rotatable relative to the input shaft 24. The fourth input gear is formed at an outer periphery of the fourth clutch ring 32 which is supported at the input shaft 24 to be rotatable relative to the input shaft 24. Further, the clutch hub (the hub) 34 is fixed to the input shaft 24 by, for example, spline-fitting so as not to be rotatable relative to the input shaft 24 in a manner that the clutch hub 34 is disposed between the third clutch ring 30 and the fourth clutch ring 32, and in a manner that the clutch hub 34 is arranged adjacent to or next to the third clutch ring 30 and to the fourth clutch ring 32. The third input gear (the third clutch ring) 30 meshes with the third output gear which will be described below and the fourth input gear (the fourth clutch ring) 32 meshes with the fourth output gear which will be described below.

The output shaft 42 is provided at the casing 22 to be arranged parallel to the input shaft 24. The output shaft 42 is rotatably supported at the casing 22. That is, a first end (the left end when viewed in FIG. 2) of the output shaft 42 is supported at the first wall 22b via a bearing 22b2 and a second end (the right end when viewed in FIG. 2) of the output shaft 42 is supported at the second wall 22c via a bearing 22c2.

At the output shaft 42, the first clutch ring (the first output gear) 44, the second clutch ring (the second output gear) 46, the third output gear 48, the fourth output gear 50 and a fifth output gear 52 are provided. The first clutch ring (the first output gear) 44 meshes with the first input gear 26, and a helical gear meshing with the first input gear 26 is formed at an outer circumferential surface of the first clutch ring 44. The second clutch ring (the second output gear) 46 meshes with the second input gear 28, and a helical gear meshing with the second input gear 28 is formed at an outer circumferential surface of the second clutch ring 46. The third output gear 48 meshes with the third clutch ring (the third input gear) 30, and a helical gear meshing with the third clutch ring (the third input gear) 30 is formed at an outer circumferential surface of the third output gear 48. The fourth output gear 50 meshes with the fourth clutch ring (the fourth input gear) 32, and a helical gear meshing with the fourth clutch ring (the fourth input gear) 32 is formed at an outer circumferential surface of the fourth output gear 50. The fifth output gear 52 meshes with an input gear of the differential apparatus 14, and a helical gear meshing with the input gear of the differential apparatus 14 is formed at an outer circumferential surface of the fifth output gear 52.

The clutch hub (the hub) 34 is fixed to the output shaft 42 by, for example, spline-fitting. The clutch hub 34 is disposed between the first clutch ring 44 and the second clutch ring 46 to be arranged adjacent to the first clutch ring 44 and to the second clutch ring 46. The configurations of the first clutch ring 44, the second clutch ring 46, the clutch hub 34 and the like are identical to those of the third clutch ring 30, the fourth clutch ring 32 and the clutch hub 34 at the input shaft 24, therefore the explanation will be omitted. The third output gear 48, the fourth output gear 50 and the fifth output gear 52 are fixed to the output shaft 42 by, for example, spline-fitting. The drive power of the engine 11 is inputted from the input shaft 24, is transmitted to the output shaft 42, and is finally outputted to the differential apparatus 14 via the fifth output gear 52.

A configuration of the second dog clutch transmission mechanism at the input shaft 24 is identical to that of the first dog clutch transmission mechanism at the output shaft 42, and therefore an explanation will be made on the second dog clutch transmission mechanism at the input shaft 24.

Figure 4:
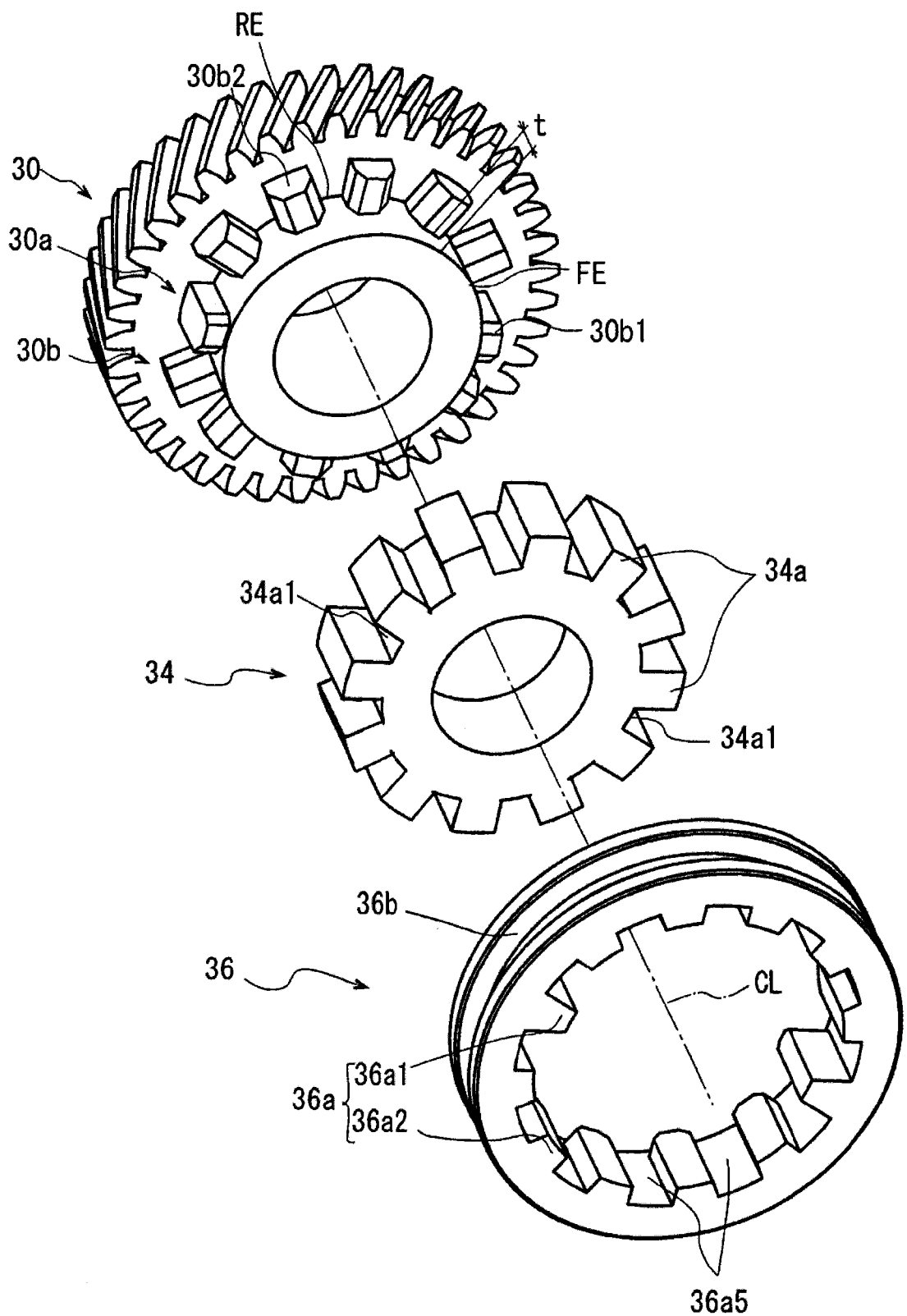
FIG. 4 is an exploded perspective view of a dog clutch transmission mechanism according to the embodiment.
Figure 6:
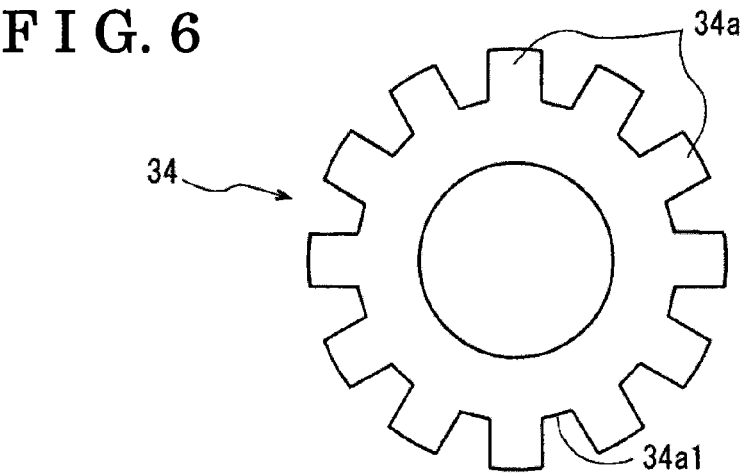
FIG. 6 is a front view of a clutch hub according to the embodiment.

As illustrated in FIGS. 10A to 10E, the clutch hub 34 is supported at the input shaft 24 by spline-fitting so as to be rotatable integrally with the input shaft 24. As illustrated in FIGS. 4 and 6, the clutch hub 34 includes an engagement hole which is spline-fitted to the input shaft 24. The clutch hub 34 is formed in a flat cylindrical shape and includes spline teeth 34a provided at an outer circumferential surface of the clutch hub 34. For example, twelve of the spline teeth 34a are arranged in a circumferential direction of the clutch hub 34 at a constant pitch. Each of the spline teeth 34a is formed to include the same diameter of an addendum circle (a tooth tip circle). Each of the spline teeth 34a is formed to include the same diameter of a dedendum circle (a tooth root circle) so that meshing grooves 34a1, each of which includes a depth with which each of high teeth 36a1 of the sleeve 36 and low teeth 36a2 of the sleeve 36 is configured to mesh, are formed. Inner teeth (i.e., a spline) 36a of the sleeve 36 are brought in engagement with the spline teeth 34a of the clutch hub 34 so as to be slidable.

Figure 7:
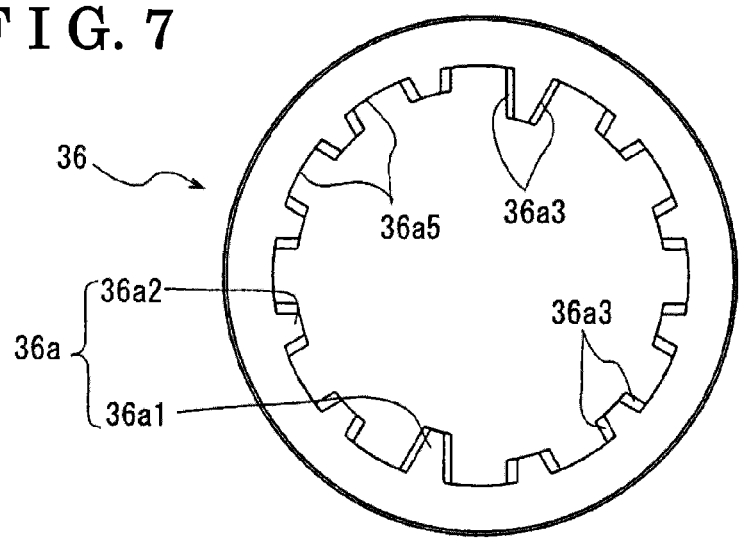
FIG. 7 is a front view of a sleeve according to the embodiment.
Figure 8:
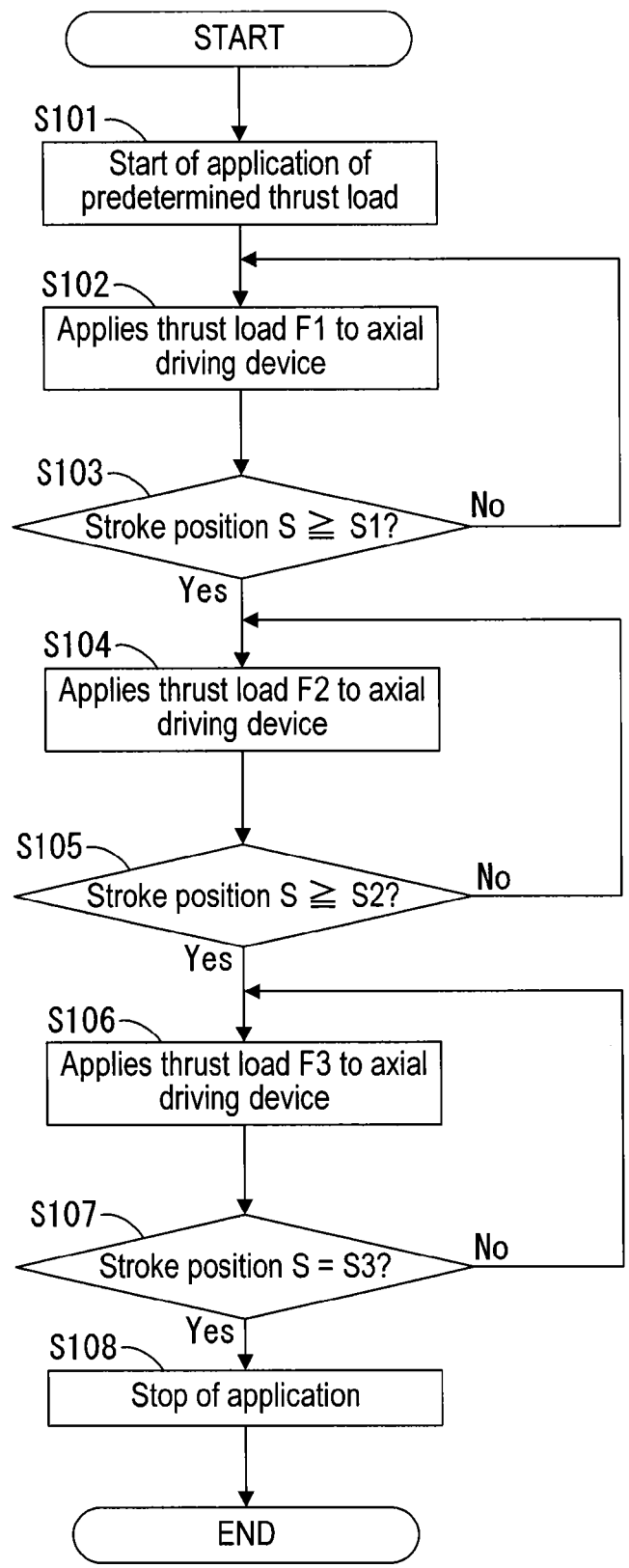
FIG. 8 is a flowchart illustrating a thrust load control of an axial driving device according to the embodiment.

The sleeve 36 is formed in a substantially annular configuration. An outer circumferential groove 36b which slidably engages with a fork 40a of the axial driving device 40 (refer to FIG. 2) is provided at an outer periphery of the sleeve 36 in a circumferential direction of the sleeve 36. As illustrated in FIGS. 4 and 7, a total of twelve inner teeth 36a provided at an inner periphery of the sleeve 36 are arranged in the circumferential direction at a constant pitch. Each of the inner teeth 36a is formed to include the same diameter of a dedendum circle. The inner teeth 36a include the high teeth 36a1 and the low teeth 36a2, and a tooth depth, that is, a tooth height (a length in a radial direction) of each of the high teeth 36a1 differs from a tooth depth of each of the low teeth 36a2. The high teeth 36a1, each of which includes a large tooth depth, that is, a high tooth height, are formed as a pair on the circumference so as to face each other at a 180 degree interval therebetween. The other inner teeth 36a, that is, the ten low teeth 36a2 include the same tooth depth which is smaller than the depth of each of the high teeth 36a1. The sleeve 36 includes end surfaces (front end surfaces 36a4) which face the third and fourth clutch rings 30 and 32, respectively. Each of the front end surfaces 36a4, that is, the surface of each of the high teeth 36a1 and the surface of each of the low teeth 36a2, which is at a right angle relative to the rotational axis CL, includes a corner located at a front portion and a rear portion of each of the end surfaces 36a4 in a rotation direction. The corner includes a chamfered surface 36a3 which is formed at 45 degrees angle relative to the rotation direction (refer to FIG. 7). Thus, the corners are prevented from being damaged and/or chipped off due to an impact with dog clutch teeth, which will be described below, of the third and fourth clutch rings 30 and 32. A tooth groove 36a5 (i.e., a tooth groove) is formed between each of the high teeth 36a1 and the low tooth 36a2 that is adjacent to the high tooth 36a1, and between the low teeth 36a2 that are adjacent to each other. Clutch front teeth 30b1 and clutch rear teeth 30b2, which will be described below, of the third clutch ring 30 fit in or mate with the tooth grooves 36a5. The high teeth 36a1 and the low teeth 36a2 of the sleeve 36 engage with the meshing grooves 34a1 of the clutch hub 34.

At the input shaft 24, the third clutch ring 30 including a third dog clutch portion 30a (i.e., a dog clutch portion) and the fourth clutch ring 32 including a fourth dog clutch portion 32a (i.e., the dog clutch portion) are provided to be adjacent to the clutch hub 34 in the direction of the rotational axis CL, that is, the third clutch ring 30 and the fourth clutch ring 32 are arranged at the respective sides of the clutch hub 34. The third clutch ring 30 and the fourth clutch ring 32 are formed to be substantially symmetrical to each other relative to the clutch hub 34 disposed therebetween, therefore the explanation will be made on the third clutch ring 30.

Figure 5:
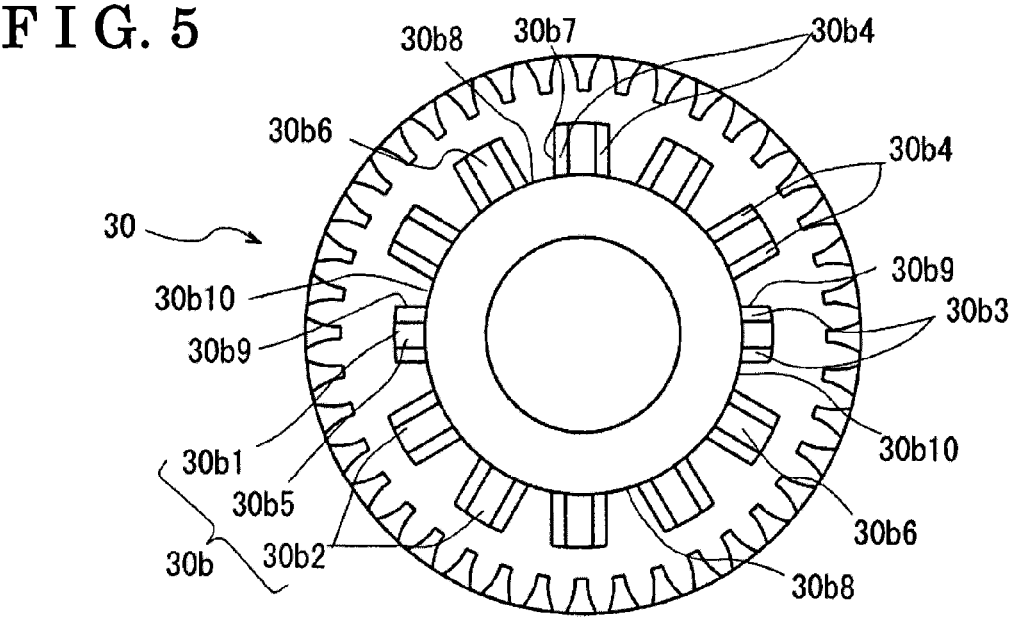
FIG. 5 is a front view of a clutch ring according to the embodiment.

As illustrated in FIGS. 4 and 5, the third clutch ring 30 is provided at the input shaft 24 via a bearing 30c so as to be rotatable relative to the input shaft 24 and so as not to be movable in a direction of the rotational axis CL relative to the input shaft 24 (refer to FIGS. 10A to 10E). The third input gear provided at an outer circumferential surface of the third clutch ring 30 forms an idler gear which is rotatable relative to the input shaft 24. The third dog clutch portion 30a is formed in a ring shape and is provided at a surface (a mating portion) of the third clutch ring 30. The surface (the mating portion), at which the third dog clutch portion 30a is provided, faces the clutch hub 34. Plural dog clutch teeth 30b which mesh with the inner teeth 36a of the sleeve 36 are provided at an outer periphery of the third dog clutch portion 30a. The dog clutch teeth 30b include two kinds of clutch teeth having different tooth depths from each other, that is, the clutch front tooth 30b1 and the clutch rear tooth 30b2. In addition, the dog clutch teeth 30b are arranged in a circumferential direction of the third clutch ring 30 at a constant pitch. Each of the dog clutch teeth 30b is formed to include the same diameter of a dedendum circle. The clutch front tooth 30b1 is formed at two positions as a pair so as to face each other. That is, one of the positions of the clutch front teeth 30b1 is rotated from the other position by 180 degrees in the circumferential direction. The clutch front teeth 30b1 are formed in such a manner that an outer diameter of an addendum circle of the clutch front teeth 30b1 is larger than an inner diameter of an addendum circle of the high teeth 36a1 of the sleeve 36 and is smaller than an inner diameter of an addendum circle of the low teeth 36a2 of the sleeve 36. Each of the clutch front teeth 30b1 is formed to be extended in the direction of the rotational axis CL from a front end surface FE of the third dog clutch portion 30a, which constitutes the mating portion, to a rear end position RE of the third dog clutch portion 30a. Each of the clutch front teeth 30b1 includes lateral surfaces 30b9 (i.e., front tooth lateral surfaces) positioned at a side towards the sleeve 36. Each of the lateral surfaces 30b9 is provided with a chamfered portion 30b3 (i.e., a front chamfered portion) inclined by 45 degrees angle relative to a rotation direction of the third clutch ring 30. In a case where the sleeve 36 comes closer to the third clutch ring 30 while rotating relative to the third clutch ring 30, the clutch front teeth 30b1 are configured to be brought into engagement with the high teeth 36a1 of the sleeve 36 without engaging with the low teeth 36a2. A front end portion of each of the clutch front teeth 30b1 is formed by a front end surface 30b5, which faces towards the sleeve 36, of the clutch front tooth 30b1 and by the chamfered portions 30b3.

As illustrated in FIGS. 4 and 5, five of the clutch rear teeth 30b2 are arranged at a phase position between the two clutch front teeth 30b1 and another five of the clutch rear teeth 30b2 are arranged at another phase position between the two clutch front teeth 30b1, that is, ten of the clutch rear teeth 30b2 are provided in total. The clutch rear teeth 30b2 are formed in such a manner that an outer diameter of an addendum circle of the clutch rear teeth 30b2 is larger than the inner diameter of the addendum circle of the low teeth 36a2 of the sleeve 36. Each of the clutch rear teeth 30b2 is formed to be extended from a position retracted from the front end surface FE, that is, retracted from the side of the sleeve 36, by a predetermined amount t in the direction of the rotational axis CL, to the rear end position RE of the third dog clutch portion 30a which constitutes the mating portion. Each of the clutch rear teeth 30b2 includes lateral surfaces 30b7 (i.e., rear tooth lateral surfaces) positioned at a side towards the sleeve 36. Each of the lateral surfaces 30b7 is provided with a chamfered portion 30b4 (i.e., a rear chamfered portion) inclined by 45 degrees angle relative to the rotation direction. In a case where the sleeve 36 comes closer to the third clutch ring 30 while rotating relative to the third clutch ring 30, as the high teeth 36a1 and the low teeth 36a2 move into or enter the position at the third clutch ring 30, the position which is retracted by the predetermined amount t, the clutch rear teeth 30b2 engage with the high teeth 36a1 and the low teeth 36a2 of the sleeve 36. As the clutch rear teeth 30b2 engage with the high teeth 36a1 and the low teeth 36a2 of the sleeve 36, a large rotational torque is transmitted safely and reliably. A front end portion of each of the clutch rear teeth 30b2 is formed by a front end surface 30b6, which faces towards the sleeve 36, of the clutch rear tooth 30b2 and by the chamfered portions 30b4.

As the stroke position sensor 38, a position sensor from among a variety of sensor types, including, but not limited to, a position sensitive detector or a linear encoder, may be used.

Figure 3:
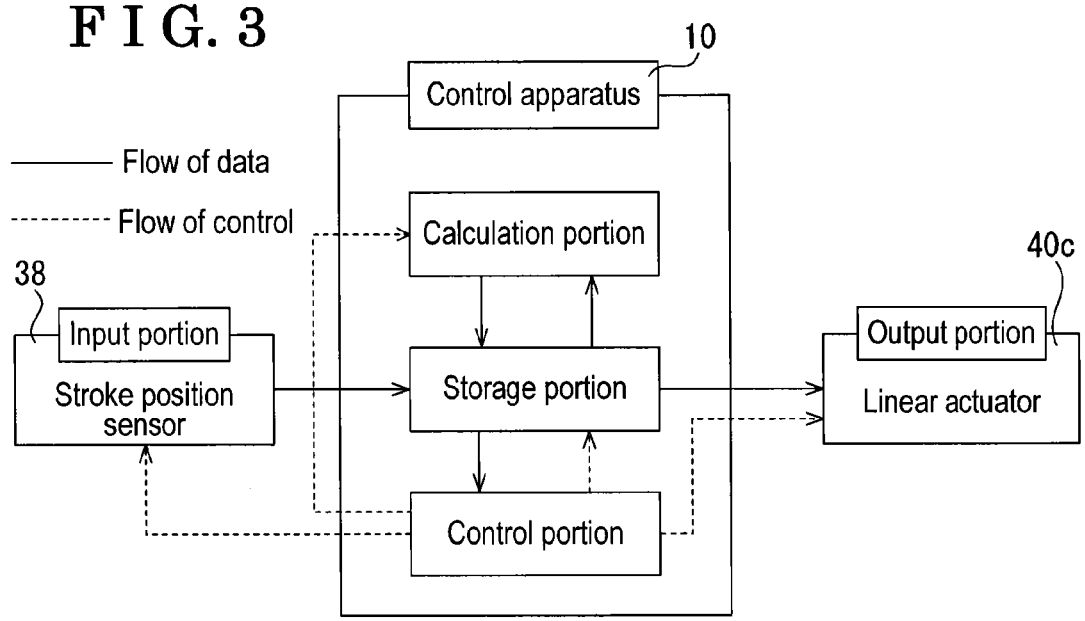
FIG. 3 is a block diagram of a control apparatus according to the embodiment.

As illustrated in FIG. 3, the control apparatus 10 includes a storage portion, a calculation portion and a control portion. The control apparatus 10 controls a thrust load value of a linear actuator 40i which drives the axial driving device 40 and a moving position of the front end surfaces 36a4 of the high teeth 36a1 on the basis of relative position signals. The relative position signals indicate a relative position of a distal end (the front end surfaces 36a4 of the high teeth 36a1) of the sleeve 36 which is detected by the stroke position sensor 38 relative to the front end surface FE of the third dog clutch portion 30a, a relative position of the distal end of the sleeve 36 which is detected by the stroke position sensor 38 relative to the front end portions of the clutch rear teeth 30b2 and a relative position of the distal end of the sleeve 36 which is detected by the stroke position sensor 38 relative to the rear end position RE of the third dog clutch portion 30a, respectively.

The axial driving device 40 reciprocates the sleeve 36 along the axial direction, that is, the sleeve 36 performs the axial movement. In a case where the sleeve 36 is pressed or pushed against the third clutch ring 30 or the fourth clutch ring 32 and when a reaction force is applied from the third clutch ring 30 or the fourth clutch ring 32, the axial driving device 40 allows the sleeve 36 to be moved by the reaction force.

The axial driving device 40 includes the fork 40a, a fork shaft 40b and a drive device 40c. A distal end portion of the fork 40a is formed to match a shape of an outer circumferential configuration of the outer circumferential groove 36b of the sleeve 36. A base end portion of the fork 40a is fixed to the fork shaft 40b. The fork shaft 40b is supported at the casing 22 to be slidable along the axial direction. That is, a first end (the left end when viewed in FIG. 2) of the fork shaft 40b is supported at the first wall 22b via a bearing 22b3 and a second end side (the right end when viewed in FIG. 2) of the fork shaft 40b is fixed at a bracket 40d. The bracket 40d is slidably supported by a guide member (a rotation lock) 40e which protrudes in the axial direction from the second wall 22c and the bracket 40d is fixed to a nut member 40f so as not to be rotatable relative thereto. The nut member 40f is threadedly engaged with a driving shaft 40h, which is provided with the drive device 40c, in a manner that the nut member 40f may advance or retreat, that is, the nut member 40f may reciprocate in the axial direction. The driving shaft 40h is supported at the second wall 22c via a bearing 22c3.

The drive device 40c is a linear drive apparatus of which drive source is the linear actuator 40i. The linear actuator 40i includes, but not limited to, a linear actuator of a ball screw type. The ball screw type linear actuator includes, for example, a casing, a rotor, the driving shaft 40h (a ball screw shaft) and the nut member 40f. The casing is formed in a cylindrical shape, and includes plural coils which are arranged in an inner circumferential direction and serve as a stator. The rotor is arranged to be rotatable relative to the stator, and includes plural north pole magnets and south pole magnets. The north pole magnets and the south pole magnets face the stator with a magnetic gap provided between the magnets and the stator, and are arranged at an outer circumference to alternate with each other. The driving shaft 40h rotates about a rotational axis of the stator integrally with the rotor. The nut member 40f includes a ball nut which threadedly engages with the driving shaft 40h. The driving shaft 40h is screwed into the nut member 40f to be rotatable relative to the nut member 40f via plural balls. As electrification to each of the coils of the stator is controlled, the driving shaft 40h rotates in the forward direction and the backward direction arbitrarily thereby reciprocating the nut member 40f and the fork shaft 40b, and thus the nut member 40f and the fork shaft 40b are positioned and retained at arbitrary positions. In addition, because the ball screw shaft is formed to include a long lead, the axial driving device 40 allows the sleeve 36 to be moved by the reaction force which is applied from the third clutch ring 30 or the fourth clutch ring 32 in a case such a reaction force is applied to the sleeve 36. A detent mechanism 58 is provided at the fork shaft 40b to be positioned in a vicinity of the first wall 22b. The detent mechanism 58 includes a stopper 58a which is biased by a spring in a direction that is perpendicular to an axis of the fork shaft 40b. As the stopper 58a is fitted by a spring force into a triangular groove 59, which is provided at the fork shaft 40b at plural positions along the axis, the fork shaft 40b is configured so that the sliding movement of the fork shaft 40b is positioned at an arbitrary position.

The linear actuator of the ball screw type is used as the drive device in this embodiment, however, other drive device, including, but not limited to, a solenoid drive device or a hydraulic drive device may be used as long as the drive device allows the sleeve 36 to be moved by the reaction force which is applied from the third clutch ring 30 or the fourth clutch ring 32 in a case where the sleeve 36 is pushed against the third clutch ring 30 or the fourth clutch ring 32.

Next, an operation of the above-described dog clutch apparatus for the automated transmission will be explained with reference to FIGS. 8 to 11. Here, for example, at an up-shift operation, in a case where the sleeve 36 rotates at a high speed and with a small moment of inertia and the third clutch ring 30 (the third input gear) rotates at a low speed and with a large moment of inertia, the speed of the sleeve 36 is reduced. On the other hand, in a case where the sleeve 36 rotates at a low speed and with a small moment of inertia, and the third clutch ring 30 rotates at a high speed and with a large moment of inertia at a down-shift operation, the speed of the sleeve 36 is increased. Hereunder, an operation for reducing the speed of the sleeve 36 in a case where the up-shift operation is performed will be explained.

Figure 10A:
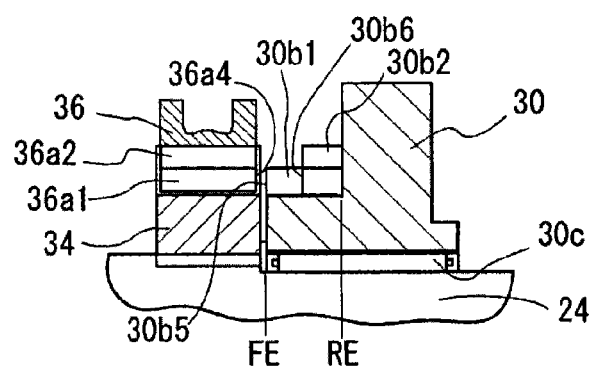
FIG. 10A is a cross-sectional view illustrating the dog clutch when a sleeve is at a neutral position according to the embodiment.

First, the sleeve 36 is positioned between the third clutch ring 30 and the fourth clutch ring 32, and the spline (the inner teeth) 36a of the sleeve 36 is positioned at a neutral position where the inner teeth 36a are not engaged with the dog clutch teeth 30b and the like of any of the third clutch ring 30 and the fourth clutch ring 32 (refer to FIG. 10A).

Figure 9:
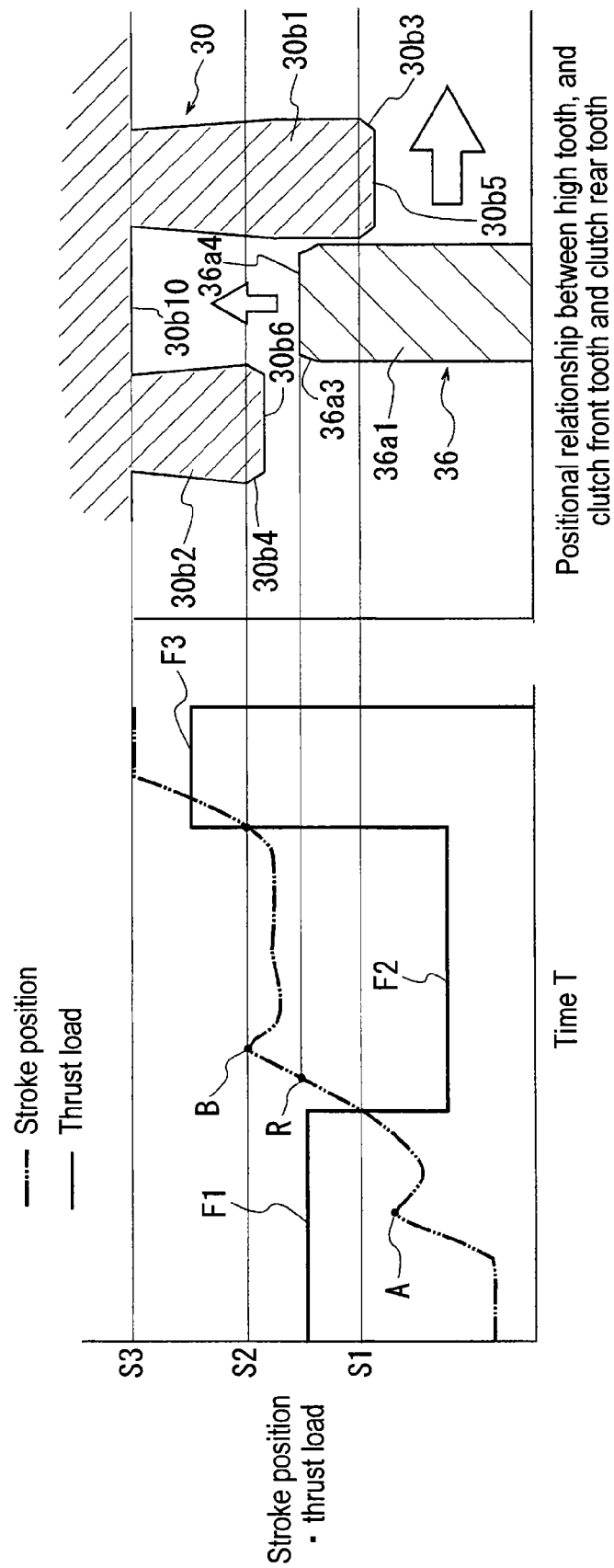
FIG. 9 is a diagram illustrating a relationship of a sleeve position relative to a dog clutch portion, and the thrust value over the passage of time for shifting according to the embodiment.

In addition, as illustrated in FIG. 9, a boundary position between the chamfered portions 30b3 of each of the clutch front teeth 30b1 of the third clutch ring 30 and the lateral surface 30b9 of the clutch front tooth 30b1 corresponds to a first stroke position S1. A boundary position between the chamfered portions 30b4 of each of the clutch rear teeth 30b2 of the third clutch ring 30 and the lateral surfaces 30b7 of the clutch rear tooth 30b2 corresponds to a second stroke position S2. A rear end surface of each of the clutch rear teeth 30b2 (the rear end position RE of the third dog clutch portion 30a) corresponds to a third stroke position S3.

A range in which the end surface (the front end surface 36a4), which faces the third clutch ring 30, of the high tooth 36a1 of the sleeve 36 moves is divided into three moving ranges, that is, a moving range from the neutral position to the first stroke position S1, a moving range from the first stroke position S1 to the second stroke position S2 (which corresponds to a rotation adjustment range) and a moving range from the second stroke position S2 to the third stroke position S3. The thrust load applied by the axial driving device 40 is controlled in plural stages, for example, in three stages of a thrust load F1 (i.e., second thrust load), a thrust load F2 (i.e., first thrust load) and a thrust load F3 (i.e., third thrust load) (refer to FIG. 9). That is, the control apparatus 10 executes a thrust load control of the axial driving device 40.

Upon receiving a signal of shift start, the control apparatus 10 applies a control current to the linear actuator 40i of the axial driving device 40. By the control current, the predetermined thrust load is applied. (Step 101 in FIG. 8, which will be hereinafter referred to as S101). As the driving shaft 40h is elongated or extended by the linear actuator 40i, the fork shaft 40b is moved and thus the sleeve 36 is moved by the fork 40a to slide towards the third clutch ring 30. The sleeve 36 comes closer to the third clutch ring 30 while rotating relative to the third clutch ring 30, by a rotational difference between the sleeve 36 and the third clutch ring 30. At this time, the control apparatus 10 applies the thrust load F1, which is a constant load (S102).

Figure 10B:
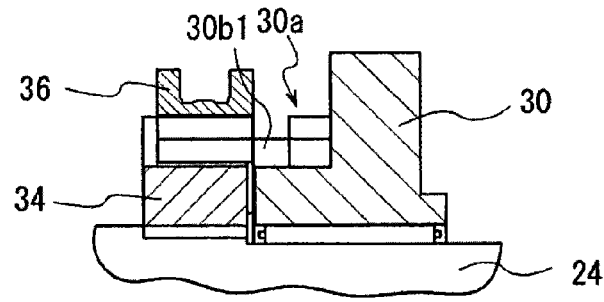
FIG. 10B is a cross-sectional view illustrating the dog clutch when the sleeve is at a first stroke position according to the embodiment.
Figure 11A:
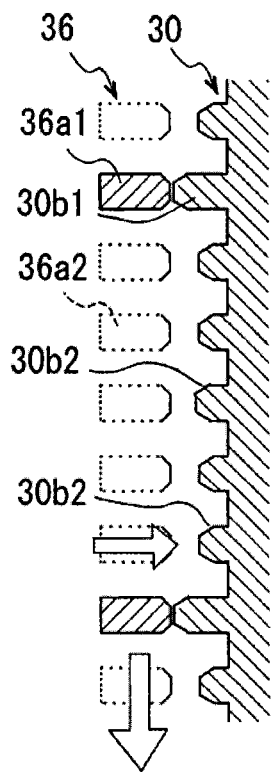
FIG. 11A is a view illustrating operation of the dog clutch, which is seen from an outer side in a radial direction.
Figure 11B:
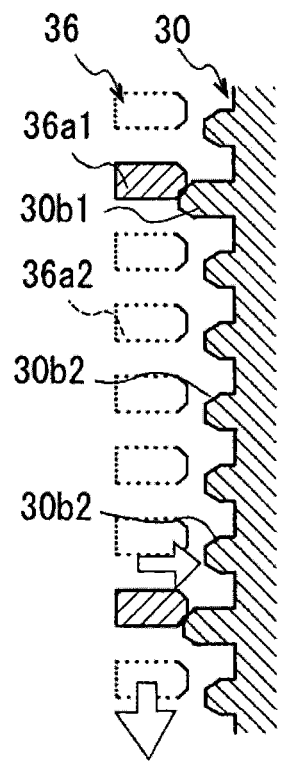
FIG. 11B is a view illustrating the operation of the dog clutch when the sleeve is at the first stroke position, which is seen from the outer side in the radial direction.
Figure 11:
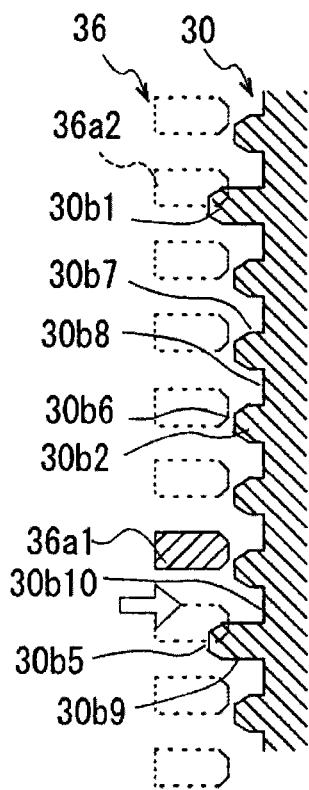
FIG. 11C is a view illustrating the operation of the dog clutch when the sleeve is in the rotation adjustment range, which is seen from the outer side in the radial direction.
FIG. 11D is a view illustrating the operation of the dog clutch when the sleeve is at the third stroke position, which is seen from the outer side in the radial direction.
Figure 11:
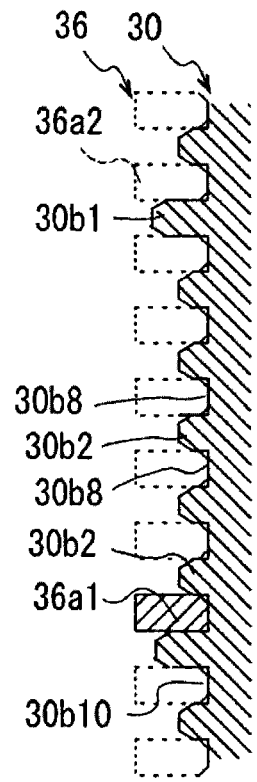

Then, as illustrated in FIGS. 10B and 11A, the high teeth 36a1 of the sleeve 36 are brought in contact with the front end surfaces 30b5 or the chamfered portions 30b3 of the clutch front teeth 30b1 of the third clutch ring 30. This contact slightly reduces the rotational difference between the sleeve 36 and the third clutch ring 30. At this time, the low teeth 36a2 of the sleeve 36 are not in contact with any portion.

Even though the front end surfaces 36a4 of the high teeth 36a1 come in contact with the front end surfaces 30b5 or with the chamfered portions 30b3 of the clutch front teeth 30b1, in a case where the front end surfaces 36a4 are bounced back without reaching the rotation adjustment range (the first stroke position S1) (a Point A in FIG. 9), the sleeve 36 is brought to approach the third clutch ring 30 again, with or by means of the thrust load F1. The thrust load F1 corresponds to the thrust load that causes a speed which enables the high teeth 36a1 to enter the rotation adjustment range in a period of time during which the third dog clutch portion 30a and the sleeve 36 further rotate relative to each other and thus the high teeth 36a1 reach the next clutch front teeth 30b1, after the high teeth 36a1 pass the predetermined clutch front teeth 30b1 of the third dog clutch portion 30a without engaging therewith due to the relative rotation between the sleeve 36 and the third clutch ring 30 in an entering preparation range. Specifically, the thrust load F1 is appropriately calculated and controlled according to, for example, an outer diameter of each of the sleeve 36 and the third dog clutch portion 30a, a pitch of the teeth that mesh with each other, and a relative rotational speed of the sleeve 36 and the third dog clutch portion 30a relative to each other.

Figure 10C:
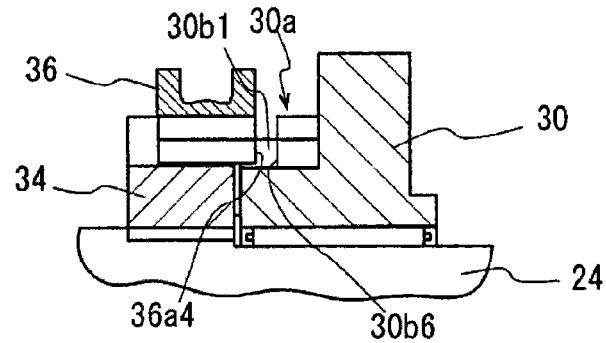
FIG. 10C is a cross-sectional view illustrating the dog clutch when the sleeve is in a rotation adjustment range according to the embodiment.

As illustrated in FIG. 10C, in a case where the sleeve 36 is brought closer to the third clutch ring 30 and then it is detected by the stroke position sensor 38 that the front end surfaces 36a4 of the high teeth 36a1 reach the first stroke position S1, the control apparatus 10 determines that the front end surfaces 36a4 of the high teeth 36a1 have entered the rotation adjustment range (S103). The control apparatus changes the thrust load applied by the axial driving device 40, to the thrust load F2 (S104). Then, in a case where the sleeve 36 is moved towards the third clutch ring 30, as illustrated in FIG. 11C, each of the high teeth 36a1 enters between the clutch front teeth 30b1. That is, the high tooth 36a1 is interposed between the lateral surfaces 30b9 of the clutch front teeth 30ba, which face each other. Each of the high teeth 36a1, of which moment of inertia is small and which is in a free state, repeatedly comes in contact with the lateral surfaces 30b9 of the clutch front teeth 30b1, and is repeatedly bounced back by the lateral surfaces 30b9 and comes out of contact therefrom. During the repetitive contact and the bounce relative to the lateral surfaces 30b9, the rotational difference comes to be reduced.

Figure 10D:
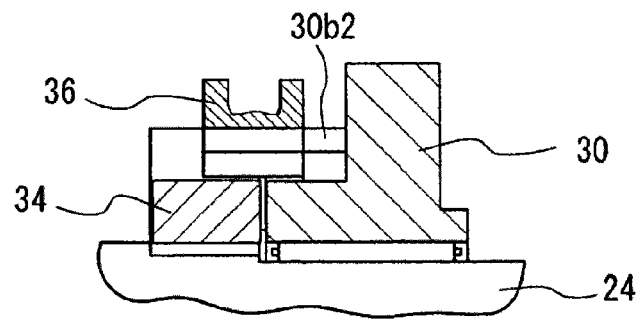
FIG. 10D is a cross-sectional view illustrating the dog clutch when the sleeve is at a second stroke position according to the embodiment.

In a case where the sleeve 36 is moved towards the third clutch ring 30, it is possible that the high teeth 36a1 of the sleeve 36 fit in or engage with any of tooth grooves 30b8 and tooth grooves 30b10 of the dog clutch teeth 30b without being guided by the lateral surfaces 30b9 of the clutch front teeth 30b1. Each of the tooth grooves 30b8 is provided between each of the clutch rear teeth 30b2 and the clutch rear tooth 30b2 that is adjacent thereto. Each of the tooth grooves 30b10 is provided between each of the clutch front teeth 30b1 and the clutch rear tooth 30b2 that is adjacent thereto. However, because a distance between the clutch rear teeth 30b2 that are adjacent to each other is short, in a case where the high teeth 36a1 (and the low teeth 36a2) are about to fit in the tooth grooves 30b8 provided between the adjacent clutch rear teeth 30b2, it is considered that the high teeth 36a1 often hit against the clutch rear teeth 30b2 and are bounced back by the clutch rear teeth 30b2 as illustrated in FIG. 10D (a Point B in FIG. 9). Accordingly, in order to bring the high teeth 36a1 to engage with the dog clutch teeth 30b quickly, it is considered to be effective that the high teeth 36a1 are guided by the lateral surfaces 30b9 of the clutch front teeth 30b1 and are brought to be fitted in the tooth grooves 30b10 that are adjacent to the respective clutch front teeth 30b1. In FIG. 9, a position of the front end surfaces 36a4 of the high teeth 36a1 is indicated with a Point R in a stroke position diagram.

However, in a case where the high teeth 36a1 are bounced back without fitting in the tooth grooves 30b10 adjacent to the clutch front teeth 30b1 in a state where the rotational difference between the sleeve 36 and the third clutch ring 30 is reduced, the high teeth 36a1 move at a relative speed with the small rotational difference until the high teeth 36a1 respectively reach the next clutch front teeth 30b1 (alternatively, the high teeth 36a1 co-rotate together with the clutch rear teeth 30b2 in a state where the high teeth 36a1 are in contact with the clutch rear teeth 30b2). Thus, it may take a long time, which may be an obstacle to the achievement of a quick or rapid shifting operation.

In this embodiment, the control apparatus 10 controls the axial driving device 40 so that the thrust load F2 is applied to the sleeve 36 in the rotation adjustment range. The thrust load F2 corresponds to the thrust load which generates the relative rotation between the sleeve 36 and the third dog clutch portion 30a against a frictional force that is generated between the end surfaces (the front end surfaces 36a4) of the high teeth 36a1 and end surfaces (the front end surfaces 30b6) of the clutch rear teeth 30b2, which are in contact with each other. Thus, it is prevented that the high teeth 36a1 from moving at the relative speed with the small rotational difference (alternatively, it is prevented that the high teeth 36a1 from co-rotating together with the clutch rear teeth 30b2 in a state where the high teeth 36a1 are in contact with the clutch rear teeth 30b2), and thus the quick shifting operation is achieved.

Next, the high teeth 36a1 of the sleeve 36 are brought to be fitted in the tooth grooves 30b10 that are adjacent to the clutch front teeth 30b1 while each of the high teeth 36a1 is guided by the corresponding lateral surfaces 30b9 of the clutch front teeth 30b1.

At this time, all the low teeth 36a2 of the sleeve 36 come to mesh with the dog clutch teeth 30b of the third clutch ring 30, including the clutch rear teeth 30b2.

Further, as the sleeve 36 comes closer to the third clutch ring 30, in a case where the stroke position sensor 38 detects that the front end surfaces 36a4 of the high teeth 36a1 reach the second stroke position S2, the control apparatus 10 determines that the high teeth 36a1 and the low teeth 36a2 started meshing with the clutch rear teeth 30b2 (S105). The control apparatus 10 changes the thrust load applied by the axial driving device 40, to the thrust load F3 (S106). The thrust load F3, which is applied at this time, corresponds to the thrust load that enables the sleeve 36 to move or slide to the third clutch ring 30 against a frictional force which is generated between the high teeth 36a1 and the low teeth 36a2, and the clutch front teeth 30b1 and the clutch rear teeth 30b2 when the sleeve 36 is slid to the third clutch ring 30. The thrust load F2 is smaller than the thrust load F1. The thrust load F3 is larger than the thrust load F1.

Figure 10E:
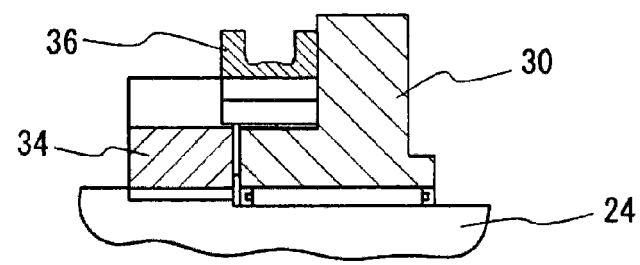
FIG. 10E is a cross-sectional view illustrating the dog clutch when the sleeve is at a third stroke position according to the embodiment.

Further, as illustrated in FIGS. 10E and 11D, as the sleeve 36 is brought closer to the third clutch ring 30, in a case where the stroke position sensor 38 detects that the front end surfaces 36a4 of the high teeth 36a1 reach the third stroke position S3, the control apparatus 10 determines that the sleeve 36 and the third clutch ring 30 have completely meshed with each other (S107). The control apparatus 10 controls the axial driving device 40 to stop the application of the thrust load (S108).

In a case where the sleeve 36 rotates at a low speed and with a small moment of inertia and the third clutch ring 30 rotates at a high speed with a large moment of inertia, for example, at the down-shift operation, the rotational speed of the sleeve 36 is increased. Thus, the relative rotation, that is, the speed of the relative rotation, between the sleeve 36 and the third clutch ring 30 is in a manner opposite to the up-shift operation as explained above. Accordingly, each of the tooth grooves 30b10 of the clutch front teeth 30b1, in which the corresponding high tooth 36a1 fits, is the tooth groove 30b10 that is positioned at an opposite side relative to the clutch front tooth 30b1 (that is, the tooth groove 30b10 that is adjacent to the clutch front tooth 30b1, below the clutch front tooth 30b1, when viewed in FIG. 11D). The other operation is identical to that in the case where the rotational speed of the sleeve 36 is reduced.

As is clear from the above description, according to the dog clutch control apparatus for the automated transmission of this embodiment, the outer diameter of the clutch front teeth 30b1 is larger than the inner diameter of the high teeth 36a1 of the sleeve 36 and is smaller than the inner diameter of the low teeth 36a2 of the sleeve 36. Accordingly, in a case where the sleeve 36 is moved to be closer to the third clutch ring 30 by the axial driving device 40, the high teeth 36a1 of the sleeve 36 are in contact with the clutch front teeth 30b1 of the third clutch ring 30, that is, the front end surfaces 36a4 and the front end surfaces 30b5 are in contact with each other, and thus the rotational difference between the sleeve 36 and the third clutch ring 30 is reduced. Then, each of the high teeth 36a1 of the sleeve 36 is moved in the direction of the rotational axis CL and enters between the adjacent clutch front teeth 30b1, and lateral surfaces of each of the high teeth 36a1 and the corresponding lateral surfaces 30b9 of the clutch front teeth 30b1 come in contact with each other. For example, in a case where the moment of inertia of the sleeve 36 is small and the sleeve 36 is in a free state, each of the high teeth 36a1 repeats the contact and the bounce relative to the lateral surfaces 30b9 of the adjacent clutch front teeth 30b1 between which the high tooth 36a1 entered, that is, the lateral surfaces 30b9 which face each other with the high tooth 36a1 interposed therebetween. Accordingly, the rotational difference is further reduced, and the sleeve 36 further comes closer to the third clutch ring 30. Because the clutch rear teeth 30b2 are arranged between each of the clutch front teeth 30b1 and the clutch front tooth 30b1 that is adjacent thereto, the high teeth 36a1 of the sleeve 36 come in contact with the clutch rear teeth 30b2 when the high teeth 36a1 enter, by the predetermined amount, from the front end surface FE of the third dog clutch portion 30a.

Then, the high teeth 36a1 fit in the tooth grooves 30b10 that are adjacent to the clutch front teeth 30b1 while being guided by the lateral surfaces 30b9 of the clutch front teeth 30b1, or the high teeth 36a1 fit directly in the tooth grooves 30b8 that are adjacent to the clutch rear teeth 30b2 without being guided by the lateral surfaces 30b9 of the clutch front teeth 30b1. At this time, even in a case where the front end surfaces 36a4 of the respective high teeth 36a1 and the front end surfaces 30b6 of the respective clutch rear teeth 30b2 are in contact with each other with the high teeth 36a1 not being fitted in the tooth grooves 30b8, the control apparatus 10 controls the thrust load applied by the axial driving device 40 so that the thrust load, which generates the relative rotation between the sleeve 36 and the third dog clutch portion 30a relative to each other against the frictional force generated between the front end surfaces 36a4 of the respective high teeth 36a1 and the front end surfaces 30b6 of the respective clutch rear teeth 30b2, is applied. Consequently, it is prevented that a difference in the number of rotations between the sleeve 36 and the third dog clutch portion 30a relative to each other from becoming slight, and it is prevented that sleeve 36 and the third dog clutch portion 30a from co-rotating with each other. Then, in a short period of time, the high teeth 36a1 fit in the next tooth grooves 30b10, respectively. At the same time, all the low teeth 36a2 fit in the tooth grooves 30b8, 30b10. Accordingly, a period of time taken for the engagement is shortened and the quick shifting operation is enabled.

In this way, even in a state where the high teeth 36a1 are not fitted in the tooth grooves 30b10, and the front end surfaces 36a4 of the respective high teeth 36a1 and the front end surfaces 30b6 of the respective clutch rear teeth 30b2 are in contact with each other, the spline (the inner teeth) 36a of the sleeve 36 and the third dog clutch portion 30a of the third clutch ring 30 are brought to mesh with each other completely and quickly.

In addition, the thrust load that the axial driving device 40 applies to the sleeve 36 in the rotation adjustment range, that is, between the first stroke position S1 and the second stroke position S2, corresponds to the thrust load which does not allow the high teeth 36a1 of the sleeve 36 to retract or move back from the rotation adjustment range in a case where the high teeth 36a1 are bounced back by the front end portions (the front end surfaces 30b6 and the chamfered portions 30b4) of the clutch rear teeth 30b2 of the third dog clutch portion 30a without advancing to a position between the clutch rear teeth 30b2 that are adjacent to each other (the tooth grooves 30b8) or to a position between the clutch rear tooth 30b2 and the clutch front tooth 30b1 that is adjacent thereto (the tooth grooves 30b10). Thus, it is prevented that the engagement between the sleeve 36 and the third dog clutch portion 30a is completely released, and accordingly a repeat of the operation for inserting the high teeth 36a1 of the sleeve 36 again to the rotation adjustment range is prevented. Consequently, the sleeve 36 and the third dog clutch portion 30a are meshed with each other quickly.

The high teeth 36a1 of the sleeve 36 are at the neutral position before engaging with the third dog clutch portion 30a. In the entering preparation range (the range between the neutral position and the first stroke position S1) in which the high teeth 36a1 move from the neutral position to enter the rotation adjustment range, after the high teeth 36a1 have passed the predetermined clutch front teeth 30b1 of the third dog clutch portion 30a, respectively, without engaging therewith, the control apparatus 10 controls the axial driving device 40 with or by means of the thrust load which generates the speed that enables the high teeth 36a1 to enter the rotation adjustment range within the period of time during which the third dog clutch portion 30a and the sleeve 36 further rotate relative to each other and thus the high teeth 36a1 reach the next clutch front teeth 30b1, respectively. Accordingly, the control is conducted so that the high teeth 36a1, which have passed the respective predetermined clutch front teeth 30b1 of the third dog clutch portion 30a without engaging with the predetermined clutch front teeth 30b1, are advanced in the period of time in which the high teeth 36a1 reach the respective next clutch front teeth 30b1, that is, in a minimum period of time in which the high teeth 36a1 can enter the rotation adjustment range. Consequently, the sleeve 36 and the third dog clutch portion 30a are meshed with each other quickly.

In this embodiment, the two clutch front teeth are provided on the circumference of the clutch ring so as to face or oppose to each other. However, for example, three or more than three clutch front teeth may be provided on the circumference of the clutch ring to be equally spaced from one another. The dog clutch transmission mechanism is configured by, for example, the sleeve, the third clutch ring and the fourth clutch ring. However, the configuration of the dog clutch transmission mechanism is not limited thereto and may include, for example, the sleeve, the first clutch ring (the first output gear) and the second clutch ring (the second output gear).

In this embodiment, the rotary shaft corresponds to the input shaft 24 of the automated transmission, which is rotatably connected to the output shaft of the engine 11 via the clutch 12, however, the embodiment is not limited thereto. For example, the rotary shaft may correspond to the output shaft for transmitting the rotational torque from the automated transmission to a driving wheel-side. Specifically, the automated transmission may include an input shaft connected to an output shaft of an engine via a clutch, a counter shaft which is arranged parallelly to the input shaft and is rotatably connected via transmission gears to the input shaft, an output shaft which includes a rotational axis that is parallel to the counter shaft and which is provided with plural idler gears that mesh with the plural transmission gears provided at the counter shaft, and the output shaft of the automated transmission may correspond to the rotary shaft. In this case, the moment of inertia is large at the sleeve-side, and the moment of inertia is small (a free state) at the clutch ring-side.

In addition, the rotary shaft which is rotatably connected to the input shaft of the automated transmission includes the rotary shaft which is connected directly to the input shaft as described in this embodiment. The rotary shaft which is rotatably connected to the output shaft of the automated transmission includes the rotary shaft which is connected directly to the output shaft.

This disclosure is not limited to the embodiment which is described above and illustrated in the drawing, but this disclosure may be appropriately changed or modified without departing from the subject matter thereof.

According to the aforementioned embodiment, the dog clutch control apparatus for the automated transmission, includes the rotary shaft 24 which is rotatably connected to one of the input shaft 24 of the automated transmission 13 and the output shaft 42 of the automated transmission 13, and is supported to be rotatable about an rotational axis CL, the dog clutch transmission mechanism including the third and fourth clutch rings 30, 32 which are rotatably supported at the rotary shaft 24 and are rotatably connected to the other one of the input shaft 24 and the output shaft 42, each of the third and fourth clutch rings 30, 32 including the mating portion protruding towards the sleeve 36, the clutch hub 34 which is fixed to the rotary shaft 24 and is arranged adjacent to the third and fourth clutch rings 30, 32, the sleeve 36 which is provided with the inner teeth 36a and is fitted with the clutch hub 34 by the inner teeth 36a to be movable in the direction of the rotational axis CL, the axial driving device 40 for moving the sleeve 36 in the direction of the rotational axis CL, the third and fourth dog clutch portions 30a, 32a which are provided at the mating portions of the third and fourth clutch rings 30, 32 respectively, and selectively mesh with the inner teeth 36a of the sleeve 36 in response to the axial movement of the sleeve 36, and the stroke position sensor 38 for detecting the moving position of the sleeve 36 in the direction of the rotational axis CL, the inner teeth 36a including the plural high teeth 36a1, the rest of the inner teeth 36a corresponding to the low teeth 36a2, the tooth depth of each of the high teeth 36a1 is larger than the tooth depth of the low tooth 36a2, the third dog clutch portion 30a including the same number of the clutch front teeth 30b1 as the number of the high teeth 36a1, the outer diameter of the clutch front teeth 30b1 is larger than the inner diameter of the high teeth 36a1 and is smaller than the inner diameter of the low tooth 36a2, the clutch front teeth 30b1 being arranged at the positions which correspond to the positions of the high teeth 36a1, each of the clutch front teeth 30b1 being formed to be extended from the front end surface FE of the third dog clutch portion 30a to the rear end position RE of the third dog clutch portion 30a, the third dog clutch portion 30a including the clutch rear teeth 30b2 configured to mesh with the tooth grooves 36a5 of the inner teeth 36a, each of the clutch rear teeth 30b2 being formed to be extended from the position which is retracted from the front end surface FE of the third dog clutch portion 30a by the predetermined amount t to the rear end position RE of the third dog clutch portion 30a, and the control apparatus 10 for controlling the operation of the axial driving device 40 on the basis of the moving position of the sleeve 36 detected by the stroke position sensor 38, wherein in the rotation adjustment range where each of the high teeth 36a1 of the inner teeth 36 advances from the front end portion of each of the clutch front teeth 30b1 to the front end portion of each of the clutch rear teeth 30b2, the control apparatus 10 controls the thrust load of the axial driving device 40 so that the thrust load F2 is applied to the sleeve 36, and the thrust load F2 generates the relative rotation between the sleeve 36 and the third dog clutch portion 30a with each other against the frictional force which is generated by contact between the front end surface 36a4 of each of the high teeth 36a1 of the sleeve 36 and the front end surface 30b6 of each of the clutch rear teeth 30b2 of the third dog clutch portion 30a.

According to the above-described configuration, the outer diameter of the clutch front teeth 30b1 is larger than the inner diameter of the high teeth 36a1 of the sleeve 36 and is smaller than the inner diameter of the low teeth 36a2 of the sleeve 36. Accordingly, in a case where the sleeve 36 is moved closer to the third clutch ring 30 by the axial driving device 40, the high teeth 36a1 of the sleeve 36 are in contact with the clutch front teeth 30b1 of the third clutch ring 30, that is, the front end surfaces 36a4 of the high teeth 36a1 and the front end surfaces 30b5 of the clutch front teeth 30b1 are in contact with each other, and thus the rotational difference between the sleeve 36 and the third clutch ring 30 is reduced. Then, each of the high teeth 36a1 of the sleeve 36 enters between the corresponding clutch front teeth 30b1 in the direction of the rotational axis CL, and the lateral surfaces of each of the high teeth 36a1 and the lateral surfaces 30b9 of the corresponding clutch front teeth 30b1 come in contact with each other. For example, in a case where the moment of inertia of the sleeve 36 is small and the sleeve 36 is in a free state, each of the high teeth 36a1 repeats the contact and the bounce relative to the lateral surfaces 30b9 of the adjacent clutch front teeth 30b1 between which the high tooth 36a1 has entered, that is, the lateral surfaces 30b9 which face each other with the high tooth 36a1 interposed therebetween. Accordingly, the rotational difference is further reduced, and the sleeve 36 further comes closer to the third clutch ring 30. Because the clutch rear teeth 30b2 are arranged between each of the clutch front teeth 30b1 and the clutch front tooth 30b1 that is adjacent thereto, the high teeth 36a1 of the sleeve 36 come in contact with the clutch rear teeth 30b2 when the high teeth 36a1 enter, by the predetermined amount, from the front end surface FE of the third dog clutch portion 30a.

Then, each of the high teeth 36a1 fits in the tooth groove 30b10 provided adjacent to the clutch rear tooth 30b2 and to the clutch front tooth 30b1 while being guided by the lateral surfaces 30b9 of the clutch front teeth 30b1, or each of the high teeth 36a1 fits in the tooth groove 30b8 provided adjacent to the clutch rear teeth 30b2 that are adjacent to each other without being guided by the lateral surfaces 30b9 of the clutch front teeth 30b1. It is ideal that the high teeth 36a1 fit in the tooth grooves 30b10 while being guided by the lateral surfaces 30b9 of the clutch front teeth 30b1. It is difficult for the high teeth 36a1 to fit in the tooth grooves 30b8 provided next to the adjacent clutch rear teeth 30b2 where no guides are provided because the high teeth 36a1 are bounced back, and thus it is ideal that the high teeth 36a1 fit in the tooth grooves 30b10 that is adjacent to the clutch front teeth 30b1 where the lateral surfaces 30b9 of the clutch front teeth 30b1 serve as the guides. At this time, even in a case where the front end surfaces 36a4 of the respective high teeth 36a1 and the front end surfaces 30b6 of the respective clutch rear teeth 30b2 are in contact with each other with the high teeth 36a1 not being fitted in the tooth grooves, the control apparatus 10 controls the thrust load of the axial driving device 40 so that the thrust load, which generates the relative rotation between the sleeve 36 and the third dog clutch portion 30a relative to each other against the frictional force generated between the front end surfaces 36a4 of the respective high teeth 36a1 and the front end surfaces 30b6 of the respective clutch rear teeth 30b2, is applied. Consequently, it is prevented that the difference in the number of rotations between the sleeve 36 and the third dog clutch portion 30a relative to each other from becoming slight, and it is prevented that sleeve 36 and the third dog clutch portion 30a from co-rotating with each other. Then, in a short period of time, the high teeth 36a1 fit in the next tooth grooves 30b10 (the tooth grooves 30b10 that are adjacent to the clutch front teeth 30b1) respectively, and at the same time, all the low teeth 36a2 fit in the tooth grooves. Accordingly, the period of time taken for the engagement is shortened and the quick shifting operation is enabled.

In this way, even in a state where the high teeth 36a1 of the sleeve 36 are not fitted in the tooth grooves 30b10 of the third dog clutch portion 30a, and the front end surfaces 36a4 of the respective high teeth 36a1 and the front end surfaces 30b6 of the respective clutch rear teeth 30b2 are in contact with each other, the inner teeth 36a of the sleeve 36 and the third dog clutch portion 30a of the third clutch ring 30 are brought to mesh with each other completely and quickly.

According to the aforementioned embodiment, in the rotation adjustment range, the thrust load F2 prevents each of the high teeth 36a1 of the sleeve 36 from retracting from the rotation adjustment range in a case where the high tooth 36a1 of the sleeve 36 is bounced back by the front end portion of the clutch rear tooth 30b2 without advancing to the position between the clutch rear teeth 30b2 that are adjacent to each other or to the position between the clutch rear tooth 30b2 and the clutch front tooth 30b1 that is adjacent to the clutch rear tooth 30b2.

According to the above-described configuration, the thrust load that the axial driving device 40 applies to the sleeve 36 in the rotation adjustment range corresponds to the thrust load which does not allow the high teeth 36a1 of the sleeve 36 to retract or move back from the rotation adjustment range in a case where the high teeth 36a1 are bounced back by the front end portions of the clutch rear teeth 30b2 of the third dog clutch portion 30a without advancing to the position between the clutch rear teeth 30b2 that are adjacent to each other (the tooth grooves 30b8 adjacent to the clutch rear teeth 30b2) or to the position between the clutch rear teeth 30b2 and the clutch front teeth 30b1 adjacent thereto (each of the tooth grooves 30b10 adjacent to the clutch front teeth 30b1). Thus, it is prevented that the engagement between the sleeve 36 and the third dog clutch portion 30a is completely released, and accordingly the repetition of the operation for inserting again the high teeth 36a1 of the sleeve 36 to the rotation adjustment range is prevented. Consequently, the sleeve 36 and the third dog clutch portion 30a are meshed with each other quickly.

According to the aforementioned embodiment, in the entering preparation range in which the high teeth 36a1 of the sleeve 36 move from the neutral position, where the high teeth 36a1 are positioned before engaging with the third dog clutch portion 30a, to enter the rotation adjustment range, in a case where the high teeth 36a1 pass the predetermined clutch front teeth 30b1 of the third dog clutch portion 30a, respectively, without engaging therewith, the control apparatus 10 controls the axial driving device 40 with the thrust load F1 which enables the high teeth 36a1 to enter the rotation adjustment range in the period of time during which the high teeth 36a1 reach the next clutch front teeth 30b1, respectively, due to the relative rotation between the third dog clutch portion 30a and the sleeve 36.

According to the above-described configuration, in the entering preparation range in which the high teeth 36a1 move from the neutral position, at which the sleeve 36 are positioned before engaging with the third dog clutch portion 30a, to enter the rotation adjustment range, after the high teeth 36a1 have rotated and then passed the predetermined clutch front teeth 30b1 of the third dog clutch portion 30a, respectively, without engaging therewith, the control apparatus 10 controls the axial driving device 40 with or by means of the thrust load F1 which generates the speed at which the high teeth 36a1 can enter the rotation adjustment range within the period of time during which the third dog clutch portion 30a and the sleeve 36 further rotate relative to each other and thus the high teeth 36a1 reach the next clutch front teeth 30b1, respectively. Accordingly, the control is conducted so that the high teeth 36a1, which failed to engage with the respective predetermined clutch front teeth 30b1 of the third dog clutch portion 30a, are advanced in the period of time in which the high teeth 36a1 reach the respective next clutch front teeth 30b1, that is, in the minimum period of time in which the high teeth 36a1 can enter the rotation adjustment range. Consequently, the sleeve 36 and the third dog clutch portion 30a are meshed with each other quickly.

According to the aforementioned embodiment, each of the clutch front teeth 30b1 includes the front end surface 30b5, the lateral surfaces 30b9 and the chamfered portions 30b3 provided between the front end surface 30b5 and each of the lateral surfaces 30b9, and the boundary position between the chamfered portions 30b3 and the lateral surfaces 30b9 corresponds to the first stroke position S1, each of the clutch rear teeth 30b2 includes the front end surface 30b6, the lateral surfaces 30b7 and the chamfered portions 30b4 provided between the front end surface 30b6 and each of the lateral surfaces 30b7, and the boundary position between the chamfered portions 30b4 and the lateral surfaces 30b7 corresponds to the second stroke position S2, and the control apparatus 10 controls the thrust load of the axial driving device 40 at the plural stages on the basis of the first stroke position S1 and the second stroke position S2 in a case where the sleeve 36 moves relative to the third clutch ring 30 in the direction of the rotational axis CL.

According to the above-described configuration, the period of time taken for the engagement is shortened and the quick shifting operation is enabled.

According to the aforementioned embodiment, the control apparatus 10 applies the thrust load F1 in a case where the moving position of the sleeve 36 is from the neutral position to the first stroke position S1, and thereby moves the sleeve 36 relative to the third clutch ring 30.

According to the above-described configuration, in a case where the moving position of the sleeve 36 is from the neutral position to the first stroke position S1, the control is conducted so that the high teeth 36a1, which failed to engage with the predetermined clutch front teeth 30b1 of the third dog clutch portion 30a, respectively, are advanced in the period of time in which the high teeth 36a1 reach the respective next clutch front teeth 30b1, that is, in the minimum period of time in which the high teeth 36a1 can enter the rotation adjustment range. Consequently, the sleeve 36 and the third dog clutch portion 30a are meshed with each other quickly.

According to the aforementioned embodiment, the control apparatus 10 applies the thrust load F2 which is smaller than the thrust load F1 in a case where the moving position of the sleeve 36 is from the first stroke position S1 to the second stroke position S2, and thereby moves the sleeve 36 relative to the third clutch ring 30.

According to the above-described configuration, it is prevented that the difference in the number of rotations between the sleeve 36 and the third dog clutch portion 30a relative to each other from becoming slight, and it is prevented that sleeve 36 and the third dog clutch portion 30a from co-rotating with each other. Then, in the short period of time, the high teeth 36a1 fit in the next tooth grooves 30b10 (the tooth grooves 30b10 that are adjacent to the clutch front teeth 30b1) respectively, and at the same time, all the low teeth 36a2 fit in the tooth grooves. Accordingly, the period of time taken for the engagement is shortened and the quick shifting operation is enabled.

According to the aforementioned embodiment, the control apparatus 10 applies the thrust load F3 which is larger than the thrust load F1 in a case where the moving position of the sleeve 36 reaches the second stroke position S2, and thereby moves the sleeve 36 relative to the third clutch ring 30.

According to the above-described configuration, the period of time taken for the engagement is shortened and the quick shifting operation is enabled.

According to the aforementioned embodiment, the rotation adjustment range corresponds to the range from the first stroke position S1 to the second stroke position S2.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A dog clutch control apparatus for an automated transmission, comprising:
   a rotary shaft which is rotatably connected to one of an input shaft of an automated transmission and an output shaft of the automated transmission, and is supported to be rotatable about an axis;
   a dog clutch transmission mechanism including
   a clutch ring which is rotatably supported at the rotary shaft and is rotatably connected to the other one of the input shaft and the output shaft, the clutch ring including a mating portion protruding towards a sleeve,
   a clutch hub which is fixed to the rotary shaft and is arranged adjacent to the clutch ring,
   the sleeve which is provided with a spline and is fitted with the clutch hub by the spline to be movable in a direction of the axis,
   an axial driving device for moving the sleeve in the direction of the axis,
   a dog clutch portion which is provided at the mating portion of the clutch ring and selectively meshes with the spline of the sleeve in response to an axial movement of the sleeve, and
   a stroke position sensor for detecting a moving position of the sleeve in the direction of the axis,
   the spline including a plurality of high teeth, the rest of the spline corresponding to a low tooth, a tooth depth of each of the high teeth is larger than a tooth depth of the low tooth, the dog clutch portion including clutch front teeth having a same number of teeth as the number of high teeth, an outer diameter of the clutch front teeth is larger than an inner diameter of the high teeth and is smaller than an inner diameter of the low tooth, the clutch front teeth being arranged at positions which correspond to positions of the high teeth, each of the clutch front teeth being formed to be extended from a front end surface of the dog clutch portion to a rear end position of the dog clutch portion, the dog clutch portion including clutch rear teeth configured to mesh with tooth grooves of the spline, each of the clutch rear teeth being formed to be extended from a position which is retracted from the front end surface of the dog clutch portion by a predetermined amount to the rear end position of the dog clutch portion; and
   a control apparatus for controlling operation of the axial driving device on the basis of the moving position of the sleeve detected by the stroke position sensor, wherein
   in a rotation adjustment range where each of the high teeth of the spline advances from a front end portion of each of the clutch front teeth to a front end portion of each of the clutch rear teeth, the control apparatus controls a thrust load of the axial driving device so that a first thrust load is applied to the sleeve, and the first thrust load generates a relative rotation between the sleeve and the dog clutch portion with each other against a frictional force which is generated by contact between an end surface of each of the high teeth of the sleeve and a front end surface of each of the clutch rear teeth of the dog clutch portion.

2. The dog clutch control apparatus according to claim 1, wherein
   in the rotation adjustment range, the first thrust load prevents each of the high teeth of the sleeve from retracting from the rotation adjustment range in a case where the high tooth of the sleeve is bounced back by the front end portion of the clutch rear tooth without advancing to a position between the clutch rear teeth that are adjacent to each other or to a position between the clutch rear tooth and the clutch front tooth that is adjacent to the clutch rear tooth.

3. The dog clutch control apparatus according to claim 1, wherein
   in an entering preparation range in which the high teeth of the sleeve move from the neutral position, where the high teeth are positioned before engaging with the dog clutch portion, to enter the rotation adjustment range, in a case where the high teeth pass predetermined clutch front teeth of the dog clutch portion, respectively, without engaging therewith, the control apparatus controls the axial driving device with a second thrust load which enables the high teeth to enter the rotation adjustment range in a period of time during which the high teeth reach the next clutch front teeth, respectively, due to the relative rotation between the dog clutch portion and the sleeve.

4. The dog clutch control apparatus according to claim 1, wherein
   each of the clutch front teeth includes a front end surface, front tooth lateral surfaces and front chamfered portions provided between the front end surface and each of the front tooth lateral surfaces, and a boundary position between the front chamfered portions and the front tooth lateral surfaces corresponds to a first stroke position,
   each of the clutch rear teeth includes the front end surface, rear tooth lateral surfaces and a rear chamfered portions provided between the front end surface and each of the rear tooth lateral surfaces, and a boundary position between the rear chamfered portions and the rear tooth lateral surfaces corresponds to a second stroke position, and
   the control apparatus controls the thrust load of the axial driving device at a plurality of stages on the basis of the first stroke position and the second stroke position in a case where the sleeve moves relative to the clutch ring in the direction of the axis.

5. The dog clutch control apparatus according to claim 4, wherein
   the control apparatus applies the second thrust load in a case where the moving position of the sleeve is from the neutral position to the first stroke position, and thereby moves the sleeve relative to the clutch ring.

6. The dog clutch control apparatus according to claim 5, wherein
the control apparatus applies the first thrust load which is smaller than the second thrust load in a case where the moving position of the sleeve is from the first stroke position to the second stroke position, and thereby moves the sleeve relative to the clutch ring.

7. The dog clutch control apparatus according to claim 4, wherein
the control apparatus applies a third thrust load which is larger than the second thrust load in a case where the moving position of the sleeve reaches the second stroke position, and thereby moves the sleeve relative to the clutch ring.

8. The dog clutch control apparatus according to claim 4, wherein the rotation adjustment range corresponds to a range from the first stroke position to the second stroke position.

\* \* \* \* \*